April 18, 1967  A. F. KOPASKA ET AL  3,314,487
MOUNTING BRACKET FOR A GROUND CONDITIONING TOOL
Filed Sept. 20, 1965  2 Sheets-Sheet 1
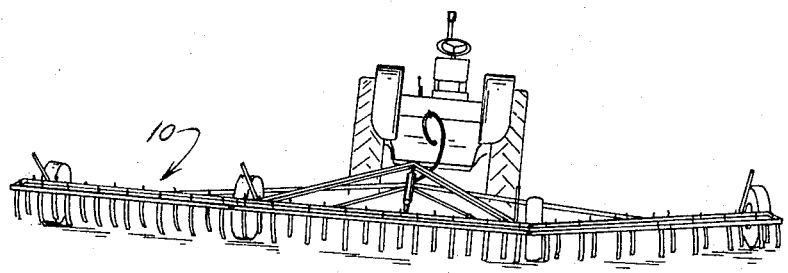
Fig. 1
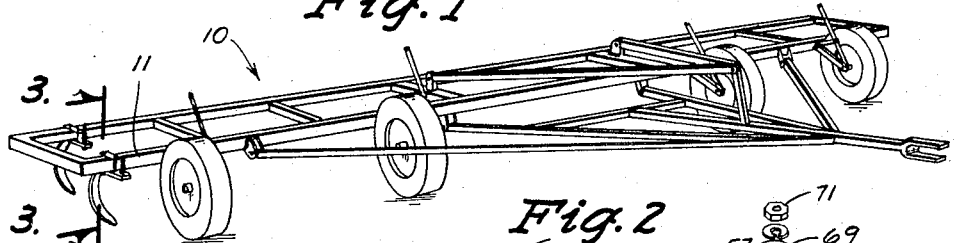
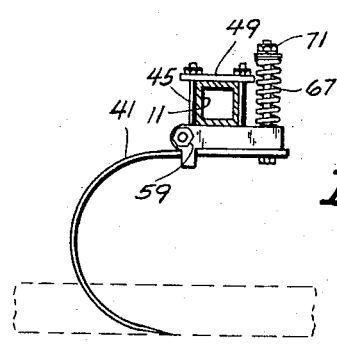
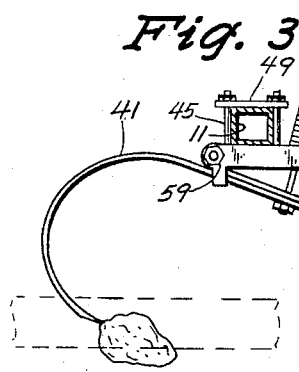
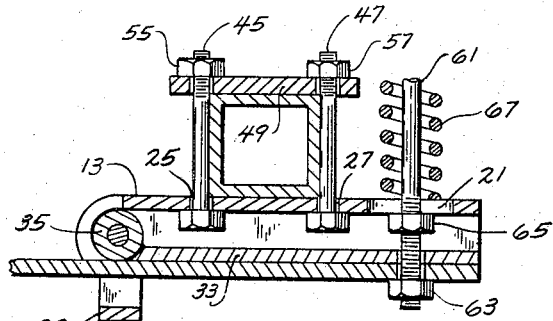
Fig. 2
Fig. 5
Fig. 3
Fig. 4
Fig. 6
INVENTORS
ARNOLD F. KOPASKA
JOHN HARLAN ROGERS
BY
ATTORNEYS April 18, 1967 A. F. KOPASKA ETAL 3,314,487
MOUNTING BRACKET FOR A GROUND CONDITIONING TOOL
Filed Sept. 20, 1965 2 Sheets-Sheet 2
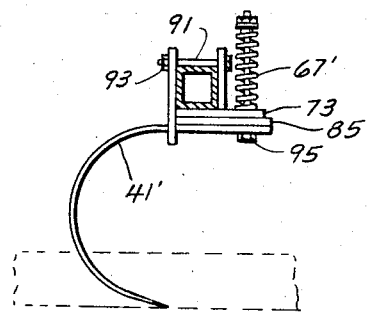
Fig. 7
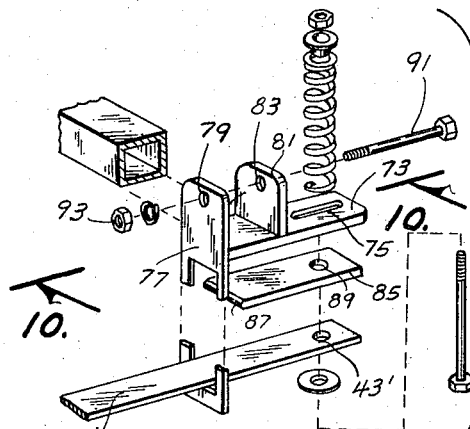
Fig. 9
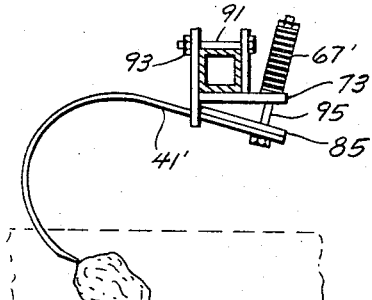
Fig. 8
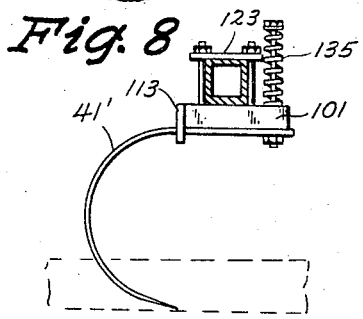
Fig. 11
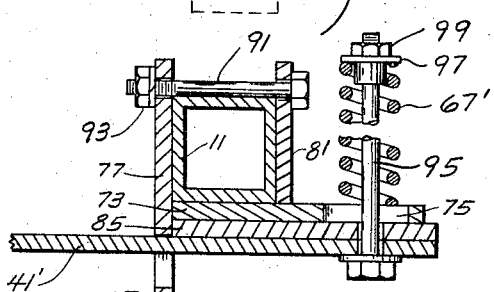
Fig. 10
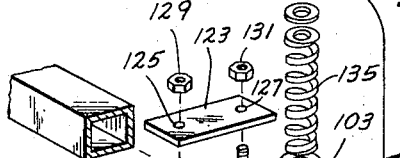
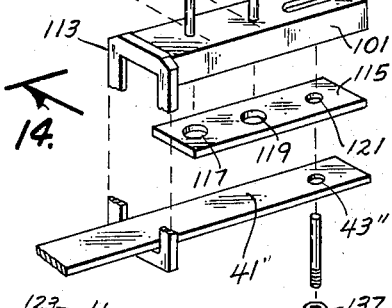
Fig. 13
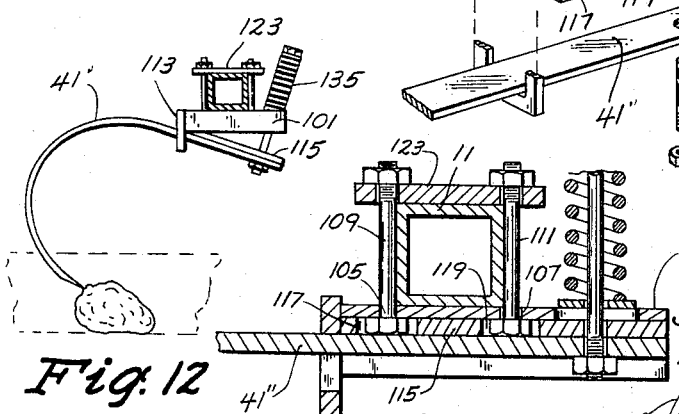
Fig. 12
Fig. 14
INVENTORS
ARNOLD F. KOPASKA
JOHN HARLAN ROGERS
BY
ATTORNEYS

United States Patent Office 3,314,487
Patented Apr. 18, 1967

3,314,487
MOUNTING BRACKET FOR A GROUND
CONDITIONING TOOL
Arnold F. Kopaska, Guthrie Center, and John H. Rogers, Fort Dodge, Iowa, assignors to The Standard Engineering Company, Fort Dodge, Iowa
Filed Sept. 20, 1965, Ser. No. 488,535
4 Claims. (Cl. 172—710)

This invention relates to a mounting bracket and more particularly to a mounting bracket for a ground conditioning tool.

Spring tooth harrows and spring tooth cultivators consist generally of a plurality of spring teeth secured to a wheeled frame means. Today's farming methods require that the spring teeth be quickly detachably mounted on the frame means so that the spacing between the spring teeth can be varied and so that the teeth can be completely removed from the frame means to permit the frame means to be used for other purposes.

Therefore, it is a principal object of this invention to provide a mounting bracket for a ground conditioning tool.

A further object of this invention is to provide a mounting bracket for a ground conditioning tool having yieldable means secured thereto to prevent breakage of the spring tooth.

A further object of this invention is to provide a mounting bracket for a ground conditioning tool which prevents wear and breakage of the spring bolt associated therewith.

A further object of this invention is to provide a mounting bracket for a ground conditioning tool which is quickly and easily detachably secured to a frame means.

A further object of this invention is to provide a mounting bracket for a ground conditioning tool which permits the spring tooth to be pivoted rearwardly about a horizontal axis to prevent the spring tooth from being damaged.

A further object of this invention is to provide a mounting bracket for a ground conditioning tool which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a rear view ground conditioning implement;

FIG. 2 is a front perspective view of a wheeled frame means having spring teeth operatively secured thereto;

FIG. 3 is a sectional view as seen on line 3—3 of FIG. 2 at an enlarged scale illustrating the position of the spring tooth in an earth engaging position with respect to the mounting bracket illustrated in FIG. 5;

FIG. 4 is a sectional view of the device as seen on line 3—3 of FIG. 2 at an enlarged scale illustrating the manner in which the spring tooth pivots about a horizontal axis with respect to the mounting bracket illustrated in FIG. 5 when the spring tooth encounters a foreign object;

FIG. 5 is an exploded perspective view of the mounting bracket;

FIG. 6 is a sectional view as would be seen along line 6—6 of FIG. 5 when the mounting bracket is in an assembled condition, at an enlarged scale;

FIG. 7 is a sectional view similar to FIG. 3 except that the modified version of the mounting bracket illustrated in FIG. 9 is illustrated;

FIG. 8 is a sectional view similar to FIG. 4 except that the modified mounting bracket illustrated in FIG. 9 is illustrated;

FIG. 9 is an exploded perspective view of a version of the mounting bracket;

FIG. 10 is a sectional view of the modified version of the mounting bracket of FIGS. 7, 8 and 9 as would be seen on line 10—10 of FIG. 9 when the mounting bracket is in an assembled condition, at an enlarged scale;

FIG. 11 is a sectional view similar to FIG. 7 except that another modified version of the mounting bracket is shown;

FIG. 12 is a sectional view similar to FIG. 8 except that the modified mounting bracket of FIG. 13 is illustrated;

FIG. 13 is an exploded perspective view of the modified version of the mounting bracket seen in FIGS. 11 and 12; and FIG. 14 is a sectional view of the modified version of the mounting bracket of FIGS. 11, 12 and 13, as would be seen on line 14—14 of FIG. 13 when the mounting bracket is in an assembled condition, at an enlarged scale.

The numeral 10 generally designates a wheeled frame means including at least one frame member 11 to which the mounting bracket of this invention is detachably secured.

With respect to the mounting bracket seen in FIGS. 3–6, the numeral 13 designates a channel member having a forward end 15, rearward end 17 and top 19. As seen in FIGS. 5 and 6, channel member 13 is provided with an elongated slot 21 formed therein adjacent its forward end and is provided with a U-shaped yoke member 23 extending downwardly therefrom at a point slightly forwardly of the rearward end thereof. Channel member 13 is also provided with a pair of spaced apart openings 25 and 27 formed in its top 19 and a pair of openings 29 and 31 formed therein adjacent its rearward end. A bar 33 is adapted to be received within channel member 13 and has a sleeve 35 secured to its rearward end which is adapted to register with openings 29 and 31 to receive a bolt member 37 extending therethrough. Bar 33 is provided with an opening 39 formed therein adjacent its forward end which registers with slot 21 in channel member 13. The numeral 41 designates a spring tooth having a substantially horizontal upper end with an opening 43 formed therein adjacent the forward end thereof.

The mounting bracket of FIGS. 3–6 is secured to frame member 11 in the following manner. Bolt members 45 and 47 are extended upwardly through openings 25 and 27 respectively and positioned rearwardly and forwardly of frame member 11 as illustrated in FIG. 6. A bar member 49 having openings 51 and 53 formed therein is positioned on the upper surface of frame member 11 so that openings 51 and 53 receive the upper ends of bolt members 45 and 47 respectively. Channel member 13 is then rigidly secured to frame member 11 by means of nuts 55 and 57. Bar member 33 is positioned within channel member 13 so that sleeve 35 is aligned with openings 29 and 31 to enable bolt member 37 to be extended therethrough and secured by means of nut 59. The upper forward end of spring tooth 41 is extended through yoke member 23 until opening 43 therein is aligned with opening 39 in bar 33 and slot 21 in channel member 13. A spring bolt 61 is then extended through openings 43 and 39 and slot 21 in the manner shown in FIGS. 5 and 6. The lower end of spring bolt 61 is provided with a nut 63 threadably mounted thereon and as seen in FIG. 6, a nut 65 is threadably mounted on spring bolt 61 at a point beneath slot 21. The upper end of spring bolt 61 is embraced by a spring 67 and is maintained thereon by means of washers 69 and nut 71. If desired, the spring bolt assembly can be mounted on channel member 13 prior to the installation of bar 33 and spring tooth 41.

With respect to the modified version of the mounting bracket seen in FIGS. 7–10, the numeral 73 designates a plate member having a slot 75 formed therein adjacent the forward end thereof and a yoke member 77 secured to the rearward end thereof. As seen in FIGS. 9 and 10, yoke member 77 extends above plate 73 and has an opening 79 formed in its upper end. Secured to plate 73 by welding or the like is an ear member 81 which extends upwardly therefrom and which is provided with an opening 83 formed therein which registers with opening 79. The numeral 85 designates a bar having a rounded rearward end 87 and an opening 89 formed therein adjacent its forward end which registers with slot 75 when bar 85 is positioned below plate 73. The numeral 41' designates a spring tooth having a substantially horizontal upper end with an opening 43' formed therein adjacent the forward end thereof.

The mounting bracket of FIGS. 7–10 is secured to frame member 11 in the following manner. The upper surface of plate member 73 is placed adjacent the lower surface of frame member 11 so that yoke member 79 is adjacent the rearward end of frame member 11 and ear member 81 is adjacent the forward end of frame member 11. A bolt member 91 is extended through openings 83 and 79 and maintained therein by means of nut 93. The tightening of nut 93 on bolt 91 draws yoke member 79 and ear member 81 into engagement with frame member 11 to prevent movement of the mounting bracket with the respective frame member 11. A spring bolt 95 is extended upwardly through openings 43' and 89 and through slot 75. A spring member 67' embraces the upper end of spring bolt 95 and is maintained thereon by means of washer 97 and nut 99.

With respect to the mounting bracket seen in FIGS. 11–14, the numeral 101 designates a channel member having a slot formed therein adjacent its forward end. Channel member 101 is also provided with openings 105 and 107 extending therethrough which are adapted to receive bolt members 109 and 111 respectively. Channel member 101 is also provided with a yoke member 113 extending downwardly from the rearward end thereof. A bar member 115 is adapted to be received by channel member 101 and is provided with a pair of large openings 117 and 119 at its rearward end and an opening 121 at its forward end. The diameters of openings 117 and 119 are adapted to receive the head portions of bolt members 109 and 111 respectively as best seen in FIG. 14. The numeral 41" designates a spring tooth having a substantially horizontal upper end with an opening 43" formed therein adjacent the forward end thereof.

The mounting bracket of FIGS. 11–14 is secured to frame member 11 in the following manner. Bolt members 109 and 111 are extended upwardly through openings 105 and 107 in channel member 101 and positioned adjacent the rearward and forward ends of frame member 11 respectively. A bar member 123 having openings 125 and 127 formed therein is positioned on the upper surface of frame 11 so that openings 125 and 127 receive bolt members 109 and 111 respectively. Channel member 101 is then rigidly secured to frame member 11 by means of nuts 129 and 131. Bar member 115 is then positioned within channel member 101 so that openings 117 and 119 are received by the head portions of bolt members 105 and 107 respectively and so that opening 121 registers with slot 103. A spring bolt 133 is embraced by a spring member 135 and has a portion thereof extending through slot 103 and openings 121 and 43" and is maintained therein by means of nut 137.

With respect to the mounting bracket of FIGS. 3–6, the normal method of operation is as follows. Assuming that the mounting bracket and spring tooth has been positioned on frame member 11 as previously described, the lower end of spring tooth 43 will normally engage the ground as seen in FIG. 3. The resistance of the ground to the passage of spring tooth 41 therethrough will cause the upper forward end of spring tooth 41 to be pivoted downwardly thereby compressing spring 67 as spring bolt 61 is pulled downwardly by spring tooth 41. The pivotal movement of spring tooth 41 is greatly increased if the tooth engages a foreign object such as a rock seen in FIG. 4. The pivotal movement of spring tooth 41 as seen in FIG. 4 causes spring bolt 61 to be moved to the position seen in FIG. 4 thereby compressing spring member 67 to yieldably resist the pivotal movement of spring tooth 41. The downward pivotal movement of the upper forward end of spring tooth 41 also causes bar 33 to be pivoted also. The downward pivotal movement of the upper forward end of spring tooth 41 causes a rearward thrust to be transmitted to bar member 33 which in turn transmits the thrust to channel member 13 due to its pivotal connection therewith. By providing a means for transmitting the rearward thrust to the channel member 13, the likelihood of the breakage of spring bolt 61 is less. Also, the fact that spring bolt 61 also extends through opening 39 in bar 33 creates a larger surface upon which spring bolt 61 may bear against. The increased wearing area reduces the amount of wear which will be created in spring bolt 61 to lengthen the life thereof. The yieldable resistance of spring member 67 can be increased or decreased by simply adjusting nut 71 on spring bolt 61.

With respect to the mounting bracket of FIGS. 7–10, the normal method of operation is as follows. The mounting bracket is assembled on channel member 11 as previously described and functions almost identically to the mounting bracket of FIGS. 3–6. It can be seen in FIG. 10 that the rearward end of bar member 85 bears against the forward surface of yoke member 77. Bar member 85 pivots as did bar member 33 in the mounting bracket just described. The rearward end of bar 85 abuts against the forward surface of yoke member 77 and pivots thereon to transmit the rearward thrust therein into yoke member 77 and plate member 73.

With respect to the mounting bracket of FIGS. 11–14, the normal method of operation is as follows. The mounting bracket of FIGS. 11–14 is secured to frame member 11 as previously described. The mounting bracket of FIGS. 11–14 functions in the manner as did the mounting bracket of FIGS. 7–10. The only difference being in the precise manner in which the various components thereof are positioned. The rearward end of bar 115 engages a forward surface of yoke member 113 and pivots thereagainst to transmit rearward thrust therein into yoke member 113 and channel member 101 to reduce the amount of strain upon spring bolt 133.

Thus it can be seen from the foregoing that a mounting bracket for a ground conditioning tool has been provided which includes a yieldable means thereon to prevent damage to the ground conditioning tool upon encountering a foreign object. It can also be appreciated that a novel mounting bracket has been provided which reduces the amount of thrust on the spring bolt to lengthen the life thereof and which prevents wearing of the spring bolt. It can also be appreciated that a simple but yet extremely efficient mounting bracket has been provided which can be quickly attached to or detached from a wheeled frame means. The mounting brackets illustrated in the drawings can be quickly and easily spaced merely by the loosening of nuts 55 and 57 in the mounting bracket of FIGS. 3–6, the loosening of nut 93 in the mounting bracket of FIGS. 7–10 and the loosening of nuts 129 and 131 in the mounting brackets seen in FIGS. 11–14.

Thus it can be seen from the foregoing that the device accomplishes at least all of its stated objectives.

Some changes may be made in the construction and arrangement of our mounting bracket for a ground conditioning tool without departing from the real spirit and purpose of our invention, and it is our intention to cover by our claims, any modified forms of structure or use of mechanical equivalents which may be reasonably included within their scope.

We claim:
1. A means for detachably securing a ground conditioning tool having a normally horizontal upper end and an opening formed in said upper end, to a frame member,
   an elongated support member having rearward and forward ends and a top portion,
   said support member having a yoke member extending downwardly from its rearward end which is adapted to pivotally receive the upper end of said tool extending forwardly therethrough,
   said support member having a slot formed in its top portion adjacent its forward end, the longitudinal axis of said slot being parallel to the longitudinal axis of said support member,
   a bar member between the upper end of said tool and said support member and having rearward and forward ends, the rearward end of said bar member operatively abutting and pivotally engaging said yoke member,
   said bar having an opening formed therein adjacent its forward end which is adapted to register with a portion of said slot and the opening in said tool upper end,
   a bolt member extending through said opening in said tool, said opening in said bar member and said slot and having a spring means operatively mounted thereon to yieldably resist the downward pivotal movement of the forward ends of said bar member and said tool,
   and means detachably securing said support member to said frame means,
   said means detachably securing said support member to said frame member including a pair of bolt members extending upwardly through said support member at opposite sides of said frame member, a plate member received by said pair of bolt members and extending therebetween across the upper portion of said frame member, and threadable means maintaining said plate member on said bolt members, said bolt members having a portion thereof protruding below said support member, said bar member having a pair of openings formed therein to freely receive the protruding portions of said bolt members respectively.

2. A means for detachably securing a ground conditioning tool having a normally horizontal upper end and an opening formed in said upper end, to a frame member,
   an elongated support member having rearward and forward ends and a top portion,
   said support member having a yoke member extending downwardly from its rearward end which is adapted to pivotally receive the upper end of said tool extending forwardly therethrough,
   said support member having a slot formed in its top portion adjacent its forward end, the longitudinal axis of said slot being parallel to the longitudinal axis of said support member,
   a bar member between the upper end of said tool and said support member and having rearward and forward ends, the rearward end of said bar member operatively abutting and pivotally engaging said yoke member,
   said bar having an opening formed therein adjacent its forward end which is adapted to register with a portion of said slot and the opening in said tool upper end,
   a bolt member extending through said opening in said tool, said opening in said bar member and said slot and having a spring means operatively mounted thereon to yieldably resist the downward pivotal movement of the forward ends of said bar member and said tool,
   and means detachably securing said support member to said frame means,
   said yoke member having a portion extending upwardly from said support member,
   an ear member extending upwardly from said support member in a spaced relationship with respect to said yoke member,
   said support member, said upwardly extending portion of said yoke member and said ear member embracing said frame member and being maintained thereon by a bolt means extending between said yoke member and said ear member across the top of said frame member.

3. A means for detachably securing a ground conditioning tool having a normally horizontal upper end and an opening formed in said upper end, to a frame member,
   an elongated support member having rearward and forward ends and a top portion,
   said support member having a yoke member extending downwardly from its rearward end which is adapted to pivotally receive the upper end of said tool extending forwardly therethrough,
   said support member having a slot formed in its top portion adjacent its forward end, the longitudinal axis of said slot being parallel to the longitudinal axis of said support member,
   a bar means operatively secured to said support member and having rearward and forward ends, the rearward end of said bar member abutting and operatively pivotally engaging said yoke member, said bar member adapted to engage and be co-extensive with the normally horizontal upper end of said tool,
   said bar having an opening formed therein adjacent its forward end which is adapted to register with a portion of said slot and the opening in said tool upper end,
   a bolt member extending through said opening in said tool, said opening in said bar member and said slot and having a spring means operatively mounted thereon to yieldably resist the downward pivotal movement of the forward ends of said bar member and said tool,
   and means detachably securing said support member to said frame means,
   said means detachably securing said support member to said frame member including a pair of bolt members extending upwardly through said support member at opposite sides of said frame member, a plate member received by said pair of bolt members and extending therebetween across the upper portion of said frame member, and threadable means maintaining said plate member on said bolt members, said bolt members having a portion thereof protruding below said support member, said bar member having a pair of openings formed therein to freely receive the protruding portions of said bolt members respectively.

4. A means for detachably securing a ground conditioning tool having a normally horizontal upper end and an opening formed in said upper end, to a frame member,
   an elongated support member having rearward and forward ends and a top portion,
   said support member having a yoke member extending downwardly from its rearward end which is adapted to pivotally receive the upper end of said tool extending forwardly therethrough,
   said support member having a slot formed in its top portion adjacent its forward end, the longitudinal axis of said slot being parallel to the longitudinal axis of said support member,
   a bar means operatively secured to said support member and having rearward and forward ends, the rearward end of said bar member abutting and operatively pivotally engaging said yoke member, said bar member adapted to engage and be co-extensive with the normally horizontal upper end of said tool, said bar having an opening formed therein adjacent its forward end which is adapted to register with a portion of said slot and the opening in said tool upper end, a bolt member extending through said opening in said tool, said opening in said bar member and said slot and having a spring means operatively mounted thereon to yieldably resist the downward pivotal movement of the forward ends of said bar member and said tool, and means detachably securing said support member to said frame means, said yoke member having a portion extending upwardly from said support member, an ear member extending upwardly from said support member in a spaced relationship with respect to said yoke member, said support member, said upwardly extending portion of said yoke member and said ear member embracing said frame member and being maintained thereon by a bolt means extending between said yoke member and said ear member across the top of said frame member.

References Cited by the Examiner
UNITED STATES PATENTS

| | | | |
|---|---|---|---|
| 2,627,798 | 2/1953 | Graham | 172—708 |
| 3,031,019 | 4/1962 | Gysler | 172—710 |
| 3,098,529 | 7/1963 | Wade | 172—710 |

ABRAHAM G. STONE, *Primary Examiner.*

WILLIAM A. SMITH III, *Examiner.*